(12) United States Patent
Heor et al.

(10) Patent No.: US 7,715,297 B2
(45) Date of Patent: May 11, 2010

(54) OPTICAL PICKUP APPARATUS AND METHOD TO REPRODUCE INFORMATION ONTO AND FROM DISCS HAVING DIFFERENT THICKNESSES AND STORAGE CAPACITIES

(75) Inventors: Tae-youn Heor, Gyeonggi-do (KR); Bong-gi Kim, Gyeonggi-do (KR); Seong-su Park, Gyeonggii-do (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 867 days.

(21) Appl. No.: 11/150,116

(22) Filed: Jun. 13, 2005

(65) Prior Publication Data
US 2005/0276205 A1 Dec. 15, 2005

(30) Foreign Application Priority Data
Jun. 11, 2004 (KR) .................... 10-2004-0043094

(51) Int. Cl.
*G11B 7/00* (2006.01)
(52) U.S. Cl. ................................. 369/112.02
(58) Field of Classification Search .............. None
See application file for complete search history.

(56) References Cited

U.S. PATENT DOCUMENTS

| 6,218,655 | B1 | 4/2001 | Ogasawara et al. |
| 6,577,376 | B1 * | 6/2003 | Shih ........................... 349/202 |
| 6,940,798 | B2 * | 9/2005 | Noborimoto et al. ..... 369/53.22 |
| 2002/0027840 | A1 | 3/2002 | Morishita et al. |
| 2002/0131006 | A1 * | 9/2002 | Yang ........................... 349/141 |

FOREIGN PATENT DOCUMENTS

| EP | 0 459 790 A2 | 12/1991 |
| EP | 0 642 051 A2 | 3/1995 |
| EP | 0459790 B1 | 4/1996 |
| EP | 1 030 296 A2 | 8/2000 |
| JP | 09-281330 | 10/1997 |
| JP | 09-282684 | 10/1997 |

(Continued)

OTHER PUBLICATIONS

Chinese Office Action mailed Sep. 8, 2006 in corresponding Chinese patent application No. 200510077875.2.

(Continued)

*Primary Examiner*—Joseph H Feild
*Assistant Examiner*—Joseph Haley (57) ABSTRACT

An optical pickup apparatus and method for recording and/or reproducing information onto and/or from optical discs having diverse specifications. Particularly, a diffraction grating for use in the optical pickup apparatus includes a substrate for refracting an output beam from a laser diode at a predetermined refractive index, a liquid crystal for refracting the beam, which is transmitted through the substrate, at a different refractive index and direction according to a track pitch of the optical disc, an electrode material for supplying power to the liquid crystal, and a switch for controlling power supply to the electrode material. Electrode materials are aligned with various spacing in order to change the refractive index of the liquid crystal according to the wavelength of a laser and the specification of an optical disc used. Also, power supply to the electrode materials is controlled depending on the optical disc specification.

20 Claims, 6 Drawing Sheets

FOREIGN PATENT DOCUMENTS

| | | |
|---|---|---|
| JP | 10-188321 | 7/1998 |
| JP | 11-066597 | 3/1999 |
| JP | 11-084349 | 3/1999 |
| JP | 11-273128 | 10/1999 |
| JP | 2002-367215 | 12/2002 |
| JP | 2002-372611 | 12/2002 |
| KR | 1998-067256 | 10/1998 |
| KR | 1999-0077241 | 10/1999 |

OTHER PUBLICATIONS

European Search Report issued Oct. 25, 2007 in corresponding European Patent Application No. 05253573.9-2210.

\* cited by examiner

OPTICAL PICKUP APPARATUS AND METHOD TO REPRODUCE INFORMATION ONTO AND FROM DISCS HAVING DIFFERENT THICKNESSES AND STORAGE CAPACITIES

CROSS-REFERENCE TO RELATED APPLICATIONS

This application claims benefit under 35 U.S.C. § 119 from Korean Patent Application No. 2004-43094, filed on Jun. 11, 2004, the entire content of which is incorporated herein by reference.

BACKGROUND OF THE INVENTION

1. Field of the Invention

Embodiments of the present invention relate in general to optical pickup apparatuses and methods. More specifically, embodiments of the present invention relate to an optical pickup apparatus and method capable of recording and/or reproducing information onto and/or from optical discs having diverse specifications, simply by changing a diffraction angle of a laser diode, according to the wavelength of the laser diode used and the optical disc specifications.

2. Description of the Related Art

In general, optical pickup apparatuses are employed in CD players (CDPs), DVD players (DVDPs), CD-ROM drivers, and DVD-ROM drivers, to record and/or reproduce information onto and/or from a non-contact type recording medium.

The DVDP and the DVD-ROM, for example, are capable of recording and reproducing high-density data, so they have been preferably used with video and audio products. Particularly, the optical pickup apparatus for use in the DVDP is capable of recording and/or reproducing information on and/or from a DVD-ROM, and is manufactured to be compatible with the CD family media such as CD, CD-R (Recordable), CD-I, and CD-G, for example.

However, the thickness of DVDs has been standardized differently from that of the CD family media, at least in consideration of the allowable error in tilt angle and objective lens numeral aperture (NA). That is, the standard thickness of existing CD family media is 1.2 mm, whereas the standard thickness of DVDs is 0.6 mm. As such, when an optical pickup apparatus for DVDs is used for the CD family media spherical aberrations occur due to the difference in thicknesses between the two types of discs. As a result of the spherical aberrations, sufficient light intensity cannot be provided for recording an information signal or the signal reproduced from the CD is deteriorated.

In addition, the track pitch of a DVD is at least two times denser than that of a CD, and the spacing between each pit, for example, is much narrower, so the DVD storage capacity is several times larger than that of the CD storage capacity. As CD and DVDs have different thicknesses and storage capacities, wavelengths of laser beams used are different. For instance, the CD uses an infrared beam having a 780 nm wavelength for recording and/or reproducing information, while the DVD uses a red light beam of a 635 nm wavelength.

As described above, wavelengths of lasers used for the DVD and the CD are different because the DVD and the CD have different thicknesses and different track pitches. Therefore, it is difficult to reproduce information from the DVD and the CD using one optical system. In an attempt to solve this problem, lens switching methods have been developed. According to one lens switching method, two objective lenses, one for the CD and the other for the DVD, are installed. Even though this makes the product design more complicated and increases the cost of manufacture, recently it has been the best known method for use with the DVD and the CD.

Most recently, a new method has been introduced, where information is read from two media using only one DVD lens, with NA and annular control systems being typical examples thereof. Since these two systems use only one lens, they are cost effective and simplify the product design. Furthermore a hologram using two focal points with one DVD lens or a non-spherical lens corresponding to the NAs of two media can be used also.

Meanwhile, optical pickup apparatuses, depending on the type of light receiving element (or photodiode) used, can be divided into optical pickup apparatuses based on a push-pull method using a 4-split photodiode, and optical pickup apparatuses based on a 3-beam method using an 8-split photodiode. The 3-beam optical pickup apparatus is generally used for high-density discs where an accurate tracking servo performance is highly appreciated.

Figure 1:
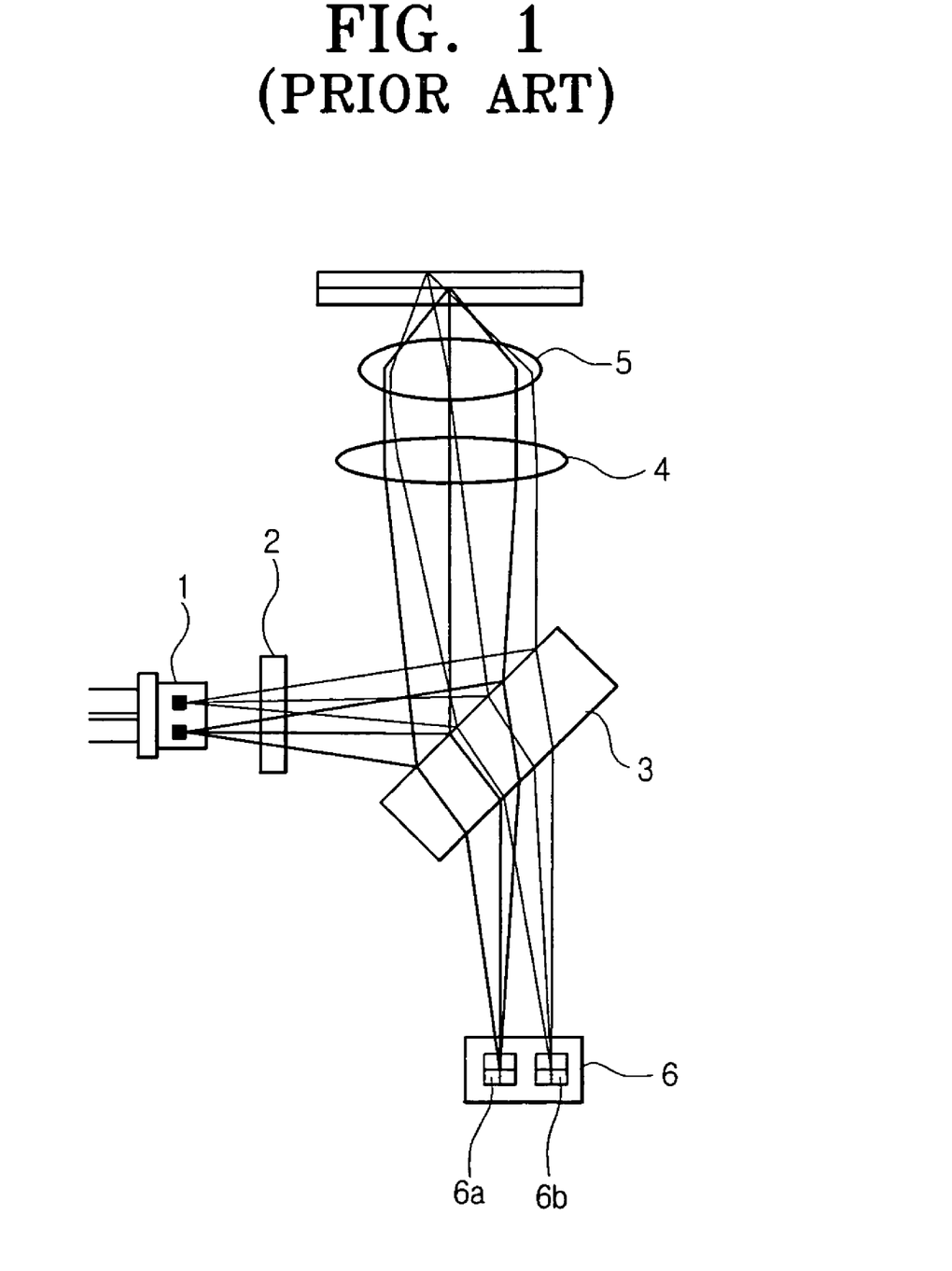
FIG. 1 illustrates a cross-sectional view of a conventional optical pickup apparatus.

As can be seen in FIG. 1, the 3-beam optical pickup apparatus includes a LD (Laser Diode) 1 for emitting two light beams of different wavelengths, a diffraction grating 2 for splitting a laser beam from the LD 1 into three discrete beams, namely one main beam and two sub beams, a beam splitter 3 for reflecting a beam off of the diffraction grating 2 towards an optical disc and transmitting a reflected beam from the optical disc, a collimator lens 4 for condensing parallel beams reflected from the beam splitter 3 to form a beam spot on an information recording surface of the optical disc, and transforming a divergent beam of the beam spot reflected from the information recording surface of the optical disc to a parallel beam (or collimated beam), an objective lens 5 for condensing the reflected light transmitted through the beam splitter 3, and a photo detector 6 for photoelectrically converting three beam spots condensed by the objective lens 5 into electric signals.

Depending on whether the information recording medium is a CD or a DVD, the LD 1 of the optical pick up apparatus outputs laser beams having different wavelengths. An output laser beam is then split by the diffraction grating 2 into a main beam and sub beams. In other words, the diffraction grating 2 reads an information signal from the laser beam output from the LD 1, and splits the laser beam into an $0^{th}$-order main beam for a focus servo of the optical disc and $±1^{st}$-order sub beams for a track servo of the optical disc.

The split beams are reflected towards the optical disc by the beam splitter 3, and focused onto the optical disc by the collimator lens 4 to form beam spots, and reflected again from the optical disc. The reflected beams from optical disc transmit through the beam splitter 3, as collected by the objective lens 5, and detected by the photo detector 6. By detecting a main beam focused on a main beam spot part 6a, the photo detector 6 reads out stored information of the beam and, at the same time, detects focusing signal error of the optical disc. The photo detector 6 detects a tracking signal error of the optical disc by using a sub beam focused on a sub beam spot part 6b.

Figure 2:
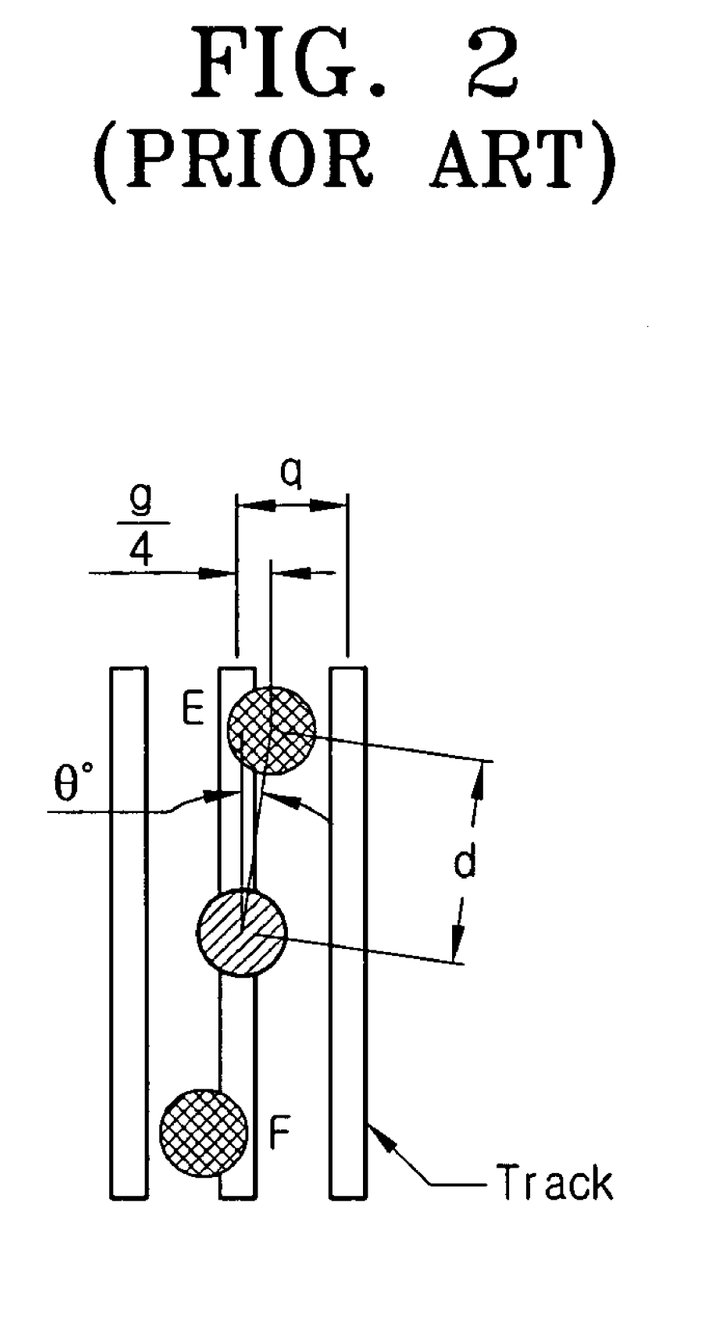
FIG. 2 illustrates a relationship between a main beam and a sub beam projected onto an optical disc.

The beams (i.e., the main beam and the sub beams) are split through the diffraction grating 2 and reflected towards the optical disc, and focused onto the optical disc by the collimator lens 4. As shown in FIG. 2, the main beam is incident on a central part, and the pair of sub beams are incident on alternate sides. The main beam should be incident accurately on the track because it should read the recorded information signal. In addition, a straight line connecting each sub beam to the main beam and the track of the optical disc are at an angle of θ. At this time, the angle θ is determined based on the tracking method.

In one case of following the track using the diffraction grating, as shown in Table 1 below, a DVD-RAM has a track pitch of 1.23 μm, a DVD-RW has a track pitch of 0.74 μm, and a CD has a track pitch of 1.60 μm. In addition to the track pitch, the track servo control method differs. As a result, the angle θ between the straight line connecting each sub beam to the main beam and the track of the optical disc differs also. For instance, the angle θ for the DVD-RAM is 2.49°, whereas the angle θ for the DVD-RW is 1.50° and the angle θ for the CD is 2.71°. These angle requirements should be met for each sub beam to be incident upon a position within a measure of the track servo method. Therefore, it is very important that the main beam and the sub beams are incident on each optical disc at a corresponding angle θ with the track. To meet the angle requirement, the diffraction grating itself was rotated to adjust the incidence positions of the main beam and the sub beams upon the optical disc, or the tracking method itself was changed.

TABLE 1

|  | BD (Blue Ray Disc) | DVD-RAM | DVD-RW | CD |
| --- | --- | --- | --- | --- |
| Wavelength (nm) | 408 | 658 | 658 | 785 |
| Focal length of collimating lens (mm) | 20 | 20 | 20 | 20 |
| Focal length of objective lens (mm) | 2.2 | 2.28 | 2.28 | 2.28 |
| Track pitch (μm) | 0.32 | 1.23 | 0.74 | 1.60 |
| Diffraction grating pitch (μm) | 20 | 20 | 20 | 20 |
| Rotation angle of diffraction grating (deg) | 1.08° | 2.49° | 1.50° | 2.71° |
| Track servo method | DPP | DPP | DPP | 3-BEAM |

Recent technical advances in the compact disc industry have introduced a BD (Blue ray Disc) with a capacity of 25 Gbytes, and there is a very high possibility that additional new discs with different specifications and greater capacities may be developed in the near future. Unfortunately though, the track pitch of the BD is 0.32 μm, which is only half of the track pitch of existing DVD-RWs, and the angle θ between the straight line connecting each sub beam to the main beam and the track of the optical disc is 1.08° degrees. Therefore, for tracking the BD, rotating the diffraction grating adjustively to the BD would be the best way. However, the rotation angle of the diffraction grating is set for the existing CDs and DVDs, so there is a limit to the rotation angle. This means that the range of the rotation angle of the diffraction grating has to be changed again adjusting for the BD. Further, a new optical system will have to be developed or an additional optical system will have to be added to the existing optical systems in order to reproduce information from BDs or discs having additional specifications that might be developed in near future. In so doing, the structure of the optical pickup apparatus, thus, has become complicated, increasing manufacturing costs.

Therefore, there is a need for an optical pickup apparatus having a diffraction grating compatible with existing CDs and DVDs as well as other discs with different specifications that might be developed in future.

SUMMARY OF THE INVENTION

It is, therefore, an aspect of the present invention to provide an optical pickup apparatus capable of recording and/or reproducing information onto and/or from optical discs having diverse specifications, simply by changing a diffraction angle of a laser based on the wavelength of the laser used and the corresponding optical disc specifications.

To achieve the above and/or other aspects and advantages, embodiments of the present invention include an optical pickup apparatus including a laser diode to emit two light beams of different wavelengths, a diffraction grating to split a light beam from the laser diode into three discrete beams having one main beam and two sub beams, a beam splitter to reflect a light beam from the diffraction grating towards an optical disc and to transmit a reflected light beam from the optical disc, an objective lens to condense the reflected light beam from the optical disc, and a photo detector to photoelectrically convert three beam spots condensed by the objective lens into electric signals.

The diffraction grating may include a substrate to refract an input beam at a predetermined refractive index, a liquid crystal to refract the substrate refracted beam at differing refractive indexes and directions according to a track pitch of the optical disc, an electrode material to supply power to the liquid crystal, and a switch to control the power supply to the electrode material for selecting one of the differing refractive indexes to read/write information from/to the optical disc.

The substrate may be a light transmitting material, and the light transmitting material may be glass.

The electrode material may include upper and lower electrode parts disposed at respective upper and lower parts of the liquid crystal, with one of the upper and lower electrode parts including a plurality of bar-shaped electrodes disposed laterally at predetermined distances from each other. The one of the upper and lower electrode parts may include a first electrode layer formed of a plurality of the plurality of bar-shaped electrodes disposed at predetermined distances from each other, and may include a second electrode layer formed of a plurality of the plurality of bar-shaped electrodes disposed in parallel with electrodes of the first electrode layer but having different widths and directions from the electrodes of the first electrode layer.

The switch may supply power to at least one of the first electrode layer and the second electrode layer based on the track pitch of the optical disc. Here, the liquid crystal may also include liquid crystal molecules formed in a plurality of parallel lines, each molecule being spaced apart by a predetermined distance, with the electrode material being in contact with the upper and lower parts of the liquid crystal, respectively, and the substrate being disposed on other planes of the electrode material not in contact with the liquid crystal. The first and second electrode layers may be aligned in different directions from each other so that respective liquid crystal molecules create different refractive indexes and directions when power is supplied through the electrode material, with the switch supplying power selectively to one of the first and second electrode layers.

The switch may be selectively turned on and off based on the track pitch of the optical disc, thereby powering the electrode material or cutting off power to the electrode material to adjust a diffraction angle of a beam transmitting through the liquid crystal.

To achieve the above and/or other aspects and advantages, embodiments of the present invention include an optical pickup method, including diffracting a light beam into discrete beams, having at least a main beam and a sub beam, the diffracting including selectively refracting a beam through differing refractive indexes and directions with a liquid crystal according to a track pitch of the optical disc by selectively supplying power to the liquid crystal through an electrode material, and photoelectrically converting detected beam spots as diffracted by the diffracting of the light beam into electric signals to detect the main beam for information recorded on a medium and the sub beam for tracking servo for the medium.

The supplying of power to the liquid crystal may include applying power to at least one of a first electrode layer formed of a plurality of bar-shaped electrodes disposed at predetermined distances from each other and a second electrode layer formed of a plurality of bar-shaped electrodes disposed in parallel with the electrodes of the first electrode layer but having different widths and directions from the electrodes of the first electrode layer. The supplying of power to at least one of the first electrode layer and the second electrode layer may be based on the track pitch of the optical disc.

The supplying of power may also include selectively turning on and off power based on a track pitch of the medium, thereby powering the electrode material or cutting off power to the electrode material to adjust a diffraction angle of a beam transmitting through the liquid crystal.

To achieve the above and/or other aspects and advantages, embodiments of the present invention include a recording and/or reproducing apparatus, including a laser diode to emit at least two light beams of different wavelengths, a diffraction grating to split a light beam from the laser diode into at least three discrete beams having at least one main beam and two sub beams, the diffraction grating including a substrate to refract an input beam at a predetermined refractive index, a liquid crystal to refract the substrate refracted beam at differing refractive indexes and directions according to a track pitch of a medium, an electrode material to supply power to the liquid crystal, and a switch to control the power supply to the electrode material for selecting one of the differing refractive indexes for generating beam spots on the medium to read/write information from/to the medium, and a photo detector to photoelectrically convert the beam spots reflected from the medium into electric signals to detect the main beam for information recorded on the medium and at least one of the sub beams for tracking servo for the medium, and to record and/or reproduce data from the medium based on the detected main beam and the at least one sub beam.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

In general, for tracking a disc using a diffraction grating, it is important to adjust diffraction efficiency and diffraction angle according to the type (i.e., specification) of the disc used. Here, the diffraction efficiency refers to a ratio between an $0^{th}$-order main beam and $\pm 1^{st}$-order sub beams. The $0^{th}$-order beam is used for reading information recorded on the disc, and the $\pm 1^{st}$-order beams are used to detect a tracking signal error in the disc. Therefore, it is not necessary to have the $0^{th}$-order beam and the $\pm 1^{st}$-order beams at the same ratio. Generally, the $0^{th}$-order beam and the $\pm 1^{st}$-order beams satisfy a ratio of 9:1, for example. The diffraction efficiency can be determined by Equations 1 and 2 below. Equation 1 can be used for calculating a diffraction efficiency of the $0^{th}$-order beam, whereas Equation 2 can be used for calculating a diffraction efficiency of the $\pm 1^{st}$-order beams.

$$E_0 = 1 - 4\alpha(1-\alpha)\sin^2\frac{\pi(n-n_0)}{\lambda}d \qquad \text{Equation 1}$$

$$E_m = \frac{4}{m^2\pi^2}\sin^2(\pi m\alpha)\sin^2\frac{\pi(n-n_0)}{\lambda}d, \qquad \text{Equation 2}$$

wherein, $\alpha$ represents a duty, d represents a depth, m represents a degree, n represents a refractive index varying based on the type of a disc used, and $n_0$ represents an original refractive index.

Meanwhile, a diffraction angle of the diffraction grating can be obtained from Equation 3 below.

$$\theta = \sin^{-1}\frac{\lambda}{P}, \qquad \text{Equation 3}$$

wherein, $\lambda$ represents a wavelength of an incident laser beam, and P represents an interval of the diffraction grating.

In addition, an angle, $\theta$, between the $0^{th}$-order beam and the $\pm 1^{st}$-order beams, and a distance, d, between the $0^{th}$-order beam and the $\pm 1^{st}$-order beams can be calculated from the following Equations 4 and 5, respectively.

$$\theta = \sin^{-1}\frac{(q/x)}{d} \qquad \text{Equation 4}$$

$$d = \frac{1}{m} * L_{LDtoGT} * \frac{\lambda}{p}, \qquad \text{Equation 5}$$

wherein, q represents a track pitch of an optical disc used, x represents a constant value according to the tracking method used (DPP=2, 3-BEAM=4), m represents a magnification of a laser diode, $L_{LDtoGT}$ represents a beam path from the laser diode to the diffraction grating plane, λ represents a wavelength, and p represents a grating interval.

As can be seen from Equations 3 through 5, the angle θ between the straight line connecting each sub beam to the main beam and the track of the optical disc is determined by the distance, d, between the main beam and the sub beam on the disc and the position, x, of the sub beam on the disc based on the track servo method.

Figure 3A:
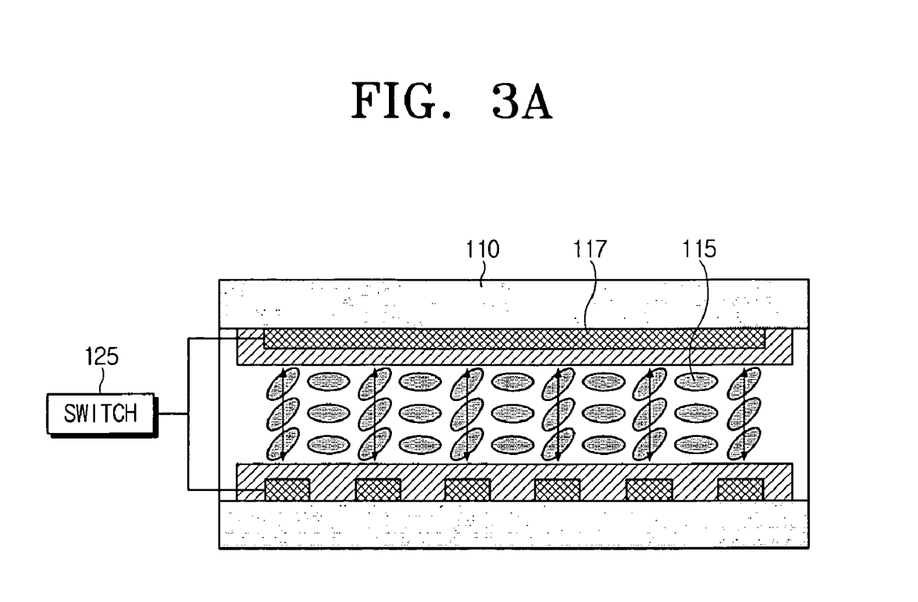
FIG. 3A is a cross-sectional view of a diffraction grating, according to an embodiment of the present invention.

According to an optical pickup apparatus of the present invention, the diffraction grating can be either controlled or selected adjustively to each track servo method. FIG. 3A illustrates a cross-sectional view of a diffraction grating, according to an embodiment of the present invention.

As can be seen in FIG. 3A, the diffraction grating includes plate substrates 110, a liquid crystal 115 whose alignment changes depending on whether power is applied, resulting in a change in the refractive index of an incident light, ITOs (Indium Tin Oxides) 117 used as an electrode material for supplying power to the liquid crystal 115, and a switch 125 for turning on/off the power to be supplied to the liquid crystal 115 through the ITO 117.

The substrates 110 can be made of light transmitting materials such as glass or plastic. Generally the glass may have a refractive index of 1.5. Therefore, a laser beam may be refracted when it transmits through the glass substrate 110 and is incident on the liquid crystal 115.

Because the liquid crystal 115 is anisotropic, it has two refractive indexes depending on whether power is supplied to the liquid crystal 115, such that the alignment of liquid crystal molecules differ. As such, the refractive indexes of the liquid crystal molecules, where power is supplied, and thus an electric field is formed are different from the refractive indexes of liquid crystal molecules where power is not supplied.

Figure 3B:
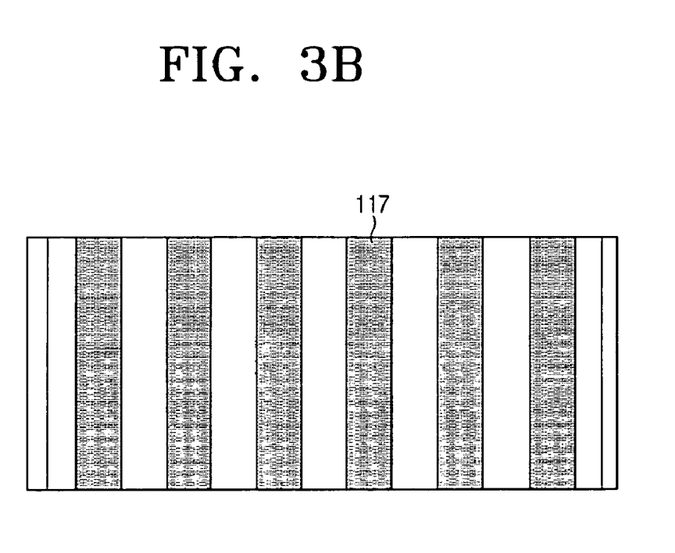
FIG. 3B illustrates an ITO of a diffraction grating, according to an embodiment of the present invention.

The ITOs 117 are disposed on and beneath the liquid crystal. The ITO 117 is a transparent conductive material, so it is mainly used for LCD electrode materials. Here, the ITO 117 disposed on the liquid crystal 115 can have a plate shape, whereas the ITO 117 disposed beneath the liquid crystal 115 may have a bar shape. As depicted in FIG. 3B, a plurality of bar-shaped ITOs 117 can be arranged laterally, maintaining a predetermined space from each other.

When power is supplied to the ITOs 117, an electrical field is formed in the ITO region disposed beneath the liquid crystal 115, as indicated by the arrow illustrated in FIG. 3A, and the alignment of liquid crystal molecules change. Then, the refractive indexes of the liquid crystal molecules, in a region where power is supplied, are different from the refractive indexes of the liquid crystal molecules in the region where power is not supplied, and the difference of the refractive index results in a phase difference of the beams that transmit through the liquid crystal 115. This phase difference causes the beams to interfere with each other and thus, the beams become diffracted. As such, the diffraction efficiency is determined by the difference of refractive index. The incident beam on the diffraction grating is diffracted by thusly formed grating, and split into a plurality of beams. Among the beams, the $0^{th}$-order and $±1^{st}$-order beams arrive at the disc and form a tracking signal.

The switch 125 can control an applied voltage to the liquid crystal 115, more specifically to the ITOs 117, according to the specifications of a medium used. The adjustment of an applied voltage to the liquid crystal molecules brings a change to the refractive index thereof, and as a result, it becomes possible to adjust the diffraction efficiency. In other words, by adjusting the width of the region to which power is supplied, the phase difference of the beams transmitting through the liquid crystal 115 can be adjusted and the diffraction efficiency between the $0^{th}$-order and the $±1^{st}$-order beams can be adjusted.

Figure 4A:
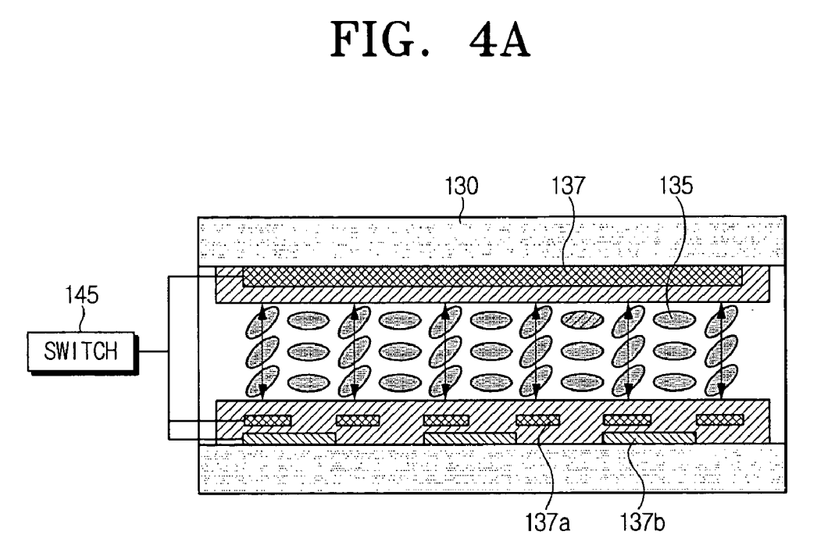
FIGS. 4A to 4C illustrate cross-sectional views of a diffraction grating, according to an embodiment of the present invention.
Figure 4B:
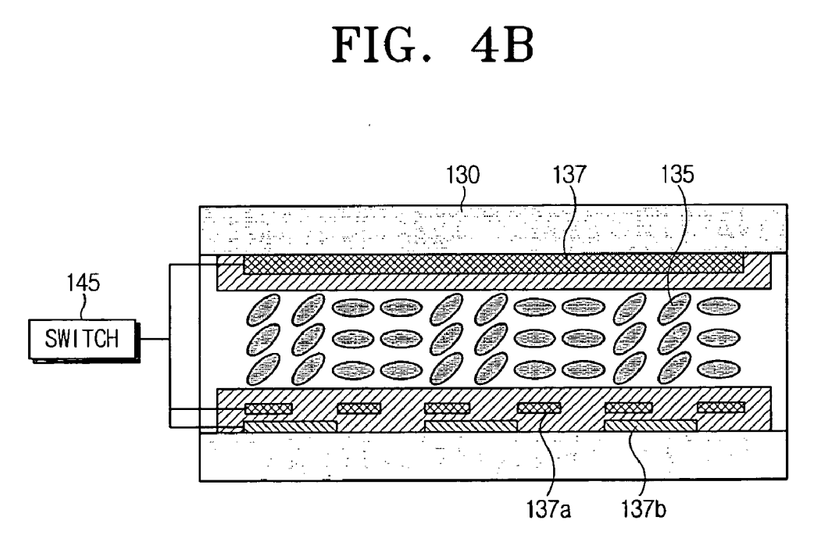
Figure 4C:
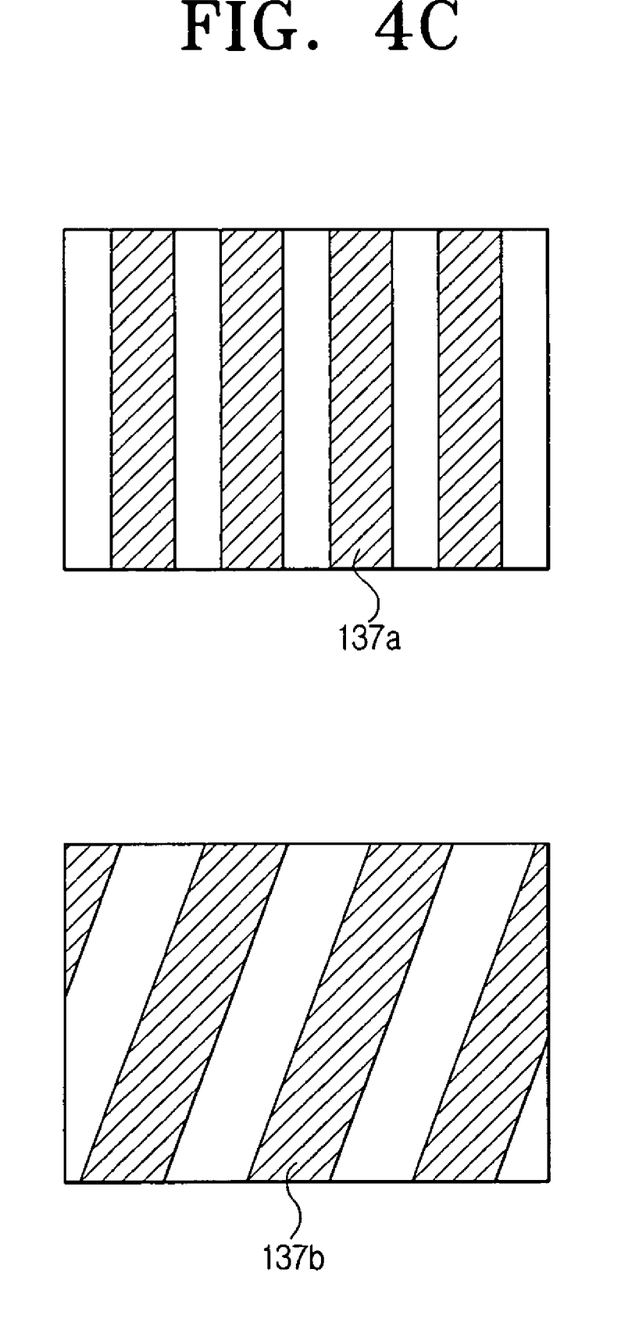

FIGS. 4A to 4C illustrate cross-sectional views of a diffraction grating according to another embodiment of the present invention. The structure of the diffraction grating may include substrates 130, a liquid crystal 135, ITOs 137, and a switch 145, which may be the same as that of the previous embodiment, except that two ITO layers 137 may be disposed beneath the liquid crystal (layer) 135, as shown in FIG. 4A. The layer disposed closer to the bottom liquid crystal layer is a first electrode layer 137a. Here, a plurality of bar-shaped ITOs are arranged laterally, maintaining a predetermined space from each other. Meanwhile, a second electrode layer 137b includes a plurality of ITOs 137, each having a larger width than the ITO in the first electrode layer 137a, arranged at an angle in a different direction. In effect, the width of the ITO of the second electrode layer 137b is larger.

The switch 145 can supply power selectively to the first electrode layer 137a and the second electrode layer 137b, to adjust the diffraction angle and the rotation angle of each beam. That is, when power is supplied to the first electrode layer 137a, the power may also be supplied to the liquid crystal molecules and an electrical field is formed in arrowed directions, as shown in FIG. 4A. As a result, neighboring liquid crystal molecules have different refractive indexes, and incident beams transmitting through the molecules are diffracted. On the other hand, when power is supplied to the second electrode layer 137b, all liquid crystal molecules are not powered. As shown in FIG. 4B, only the alignment of the powered liquid crystal molecules 135, in two lines, is changed, and the other liquid crystal molecules to which power is not supplied maintain their positions. In result, the molecules that are newly aligned have a different refractive index from the molecules that are not newly aligned, and incident beams transmitting through these molecules are diffracted. FIG. 4C illustrates that ITOs in the first electrode layer 137a and ITOs in the second electrode layer 137b may differ in their alignment angle. Accordingly, the diffraction angle of a beam at the first electrode layer 137a may be different from the diffraction angle of a beam at the second electrode layer 137b.

As such, upon incidence by laser beams having different wavelengths, according to the specification of discs used, power can be supplied selectively to one of the first and second electrode layers 137a and 137b in order to adjust the diffraction angle and the rotation angle of the beams. In so doing, the laser beams can be incident on a position of the disc such that the distance between a center of split $±1^{st}$-order beams and a center of the track can have a desired value according to the track servo method.

Figure 5:
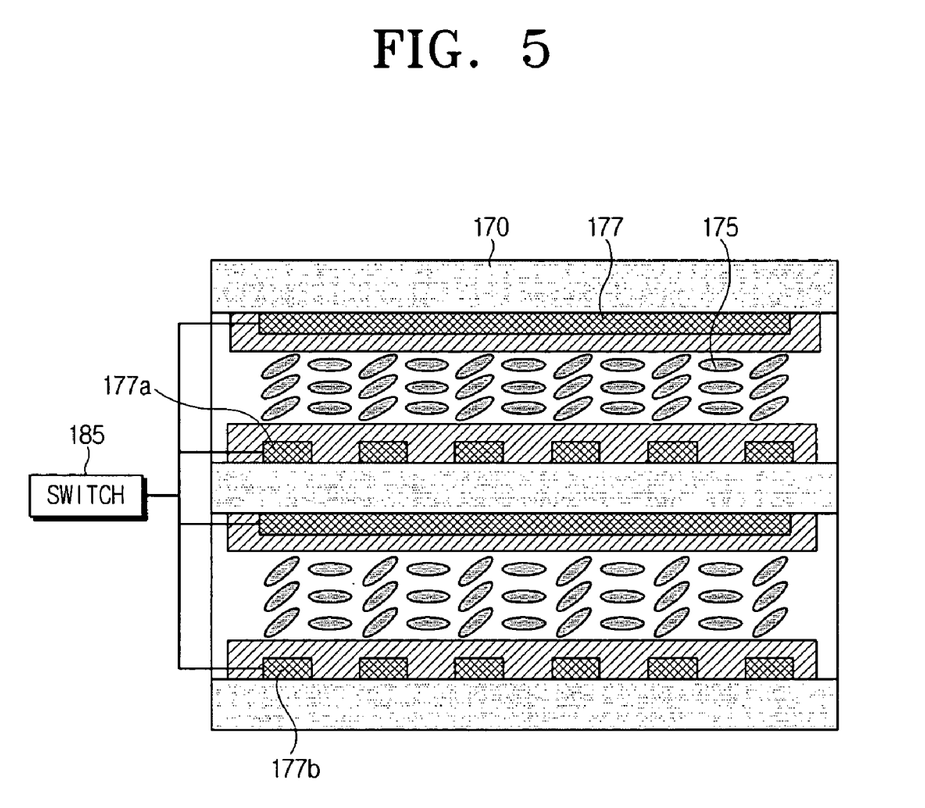
FIG. 5 illustrates another cross-sectional view of another diffraction grating, according to an embodiment of the present invention.

FIG. 5 illustrates a cross-sectional view of a diffraction grating according to another embodiment of the present invention. Here, the diffraction grating can be formed of two parallel diffraction units, each diffraction unit including a substrate 170, ITO 177a or 177b, and a liquid crystal 175. The ITOs 177a and 177b in each diffraction unit can be aligned at an angle. Particularly, the alignment of the ITOs 177a and 177b are carefully designed to ensure that the diffraction angle and the rotation angle of beams transmitting there through are different. Here, the number of diffraction units can be increased, taking the type (specification) of the disc or the wavelength of the used laser into consideration.

The switch 185 in this embodiment can supply power selectively to one of the layered diffraction units, according to the wavelength of a laser to be diffracted or the track pick of a disc used. In this manner, it becomes possible to refract a beam at a desired refractive index.

In conclusion, the alignment of the ITOs or the diffraction unit itself plays a key role in making changes in the refractive index of the liquid crystal according to respective regions. It has been discovered from the above embodiments that laser beams can be refracted at different refractive indexes when any change is made to the alignment of the ITOs or the diffraction unit(s). Therefore, the diffraction angle or the rotation angle of a laser can be changed based on the wavelength of the laser and the type (specification) of a disc used. Thus, information can be read and/or reproduced onto and/from discs having diverse specifications.

According to embodiments of the present invention, it is now possible to make the $\pm 1^{st}$-order beams to be incident with accurate positioning on an optical disc by simply changing the alignment of ITOs. Thus, the present invention can be advantageously used because the structure of the optical system and the circuit configuration are simplified, the assembly and the reliability thereof are improved, and the manufacturing costs are reduced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical pickup apparatus comprising:
    a laser diode to emit two light beams of different wavelengths;
    a diffraction grating to split a light beam from the laser diode into three discrete beams comprising one main beam and two sub beams;
    a beam splitter to reflect a light beam from the diffraction grating towards an optical disc and to transmit a reflected light beam from the optical disc;
    an objective lens to condense the reflected light beam from the optical disc; and
    a photo detector to photoelectrically convert three beam spots condensed by the objective lens into electric signals,
    wherein the diffraction grating comprises:
    a substrate to refract an input beam at a predetermined refractive index;
    a liquid crystal to refract the substrate refracted beam at differing refractive indexes and directions according to a track pitch of the optical disc;
    an electrode material to supply power to the liquid crystal; and
    a switch to control the power supply to the electrode material for selecting one of the differing refractive indexes to read/write information from/to the optical disc,
    wherein the electrode material comprises upper and lower electrode parts disposed at respective upper and lower parts of the liquid crystal, and one of the upper and lower electrode parts comprises a plurality of rectangular bar-shaped electrodes disposed laterally at predetermined distances from each other, and
    wherein the one of the upper and lower electrode parts comprises a first electrode layer formed of a plurality of the plurality of rectangular bar-shaped electrodes disposed at predetermined distances from each other, and a second electrode layer formed of a plurality of the plurality of rectangular bar-shaped electrodes disposed in parallel with electrodes of the first electrode layer but having different widths and directions from the electrodes of the first electrode layer.

2. The optical pickup apparatus of claim 1, wherein the substrate is a light transmitting material.

3. The optical pickup apparatus of claim 2, wherein the light transmitting material is glass.

4. The optical pickup apparatus of claim 1, wherein the switch supplies power to at least one of the first electrode layer and the second electrode layer based on the track pitch of the optical disc.

5. The optical pickup apparatus of claim 1, wherein the liquid crystal comprises liquid crystal molecules formed in a plurality of parallel lines, each molecule being spaced apart by a predetermined distance, with the electrode material being in contact with the upper and lower parts of the liquid crystal, respectively, and the substrate being disposed on other planes of the electrode material not in contact with the liquid crystal.

6. An optical pickup apparatus comprising:
    a laser diode to emit two light beams of different wavelengths;
    a diffraction grating to split a light beam from the laser diode into three discrete beams comprising one main beam and two sub beams;
    a beam splitter to reflect a light beam from the diffraction grating towards an optical disc and to transmit a reflected light beam from the optical disc;
    an objective lens to condense the reflected light beam from the optical disc; and
    a photo detector to photoelectrically convert three beam spots condensed by the objective lens into electric signals,
    wherein the diffraction grating comprises:
    a substrate to refract an input beam at a predetermined refractive index;
    a liquid crystal to refract the substrate refracted beam at differing refractive indexes and directions according to a track pitch of the optical disc;
    an electrode material to supply power to the liquid crystal; and
    a switch to control the power supply to the electrode material for selecting one of the differing refractive indexes to read/write information from/to the optical disc,
    wherein the electrode material comprises upper and lower electrode parts disposed at respective upper and lower parts of the liquid crystal, and one of the upper and lower electrode parts comprises a plurality of rectangular bar-shaped electrodes disposed laterally at predetermined distances from each other,
    wherein the liquid crystal comprises liquid crystal molecules formed in a plurality of parallel lines, each molecule being spaced apart by a predetermined distance, with the electrode material being in contact with the upper and lower parts of the liquid crystal, respectively, and the substrate being disposed on other planes of the electrode material not in contact with the liquid crystal, and wherein the electrodes of the first and second electrode layers are aligned in different directions from each other so that respective liquid crystal molecules create different refractive indexes and directions when power is supplied through the electrode material, with the switch supplying power selectively to one of the first and second electrode layers.

7. The optical pickup apparatus of claim 1, wherein the switch is selectively turned on and off based on the track pitch of the optical disc, thereby powering the electrode material or cutting off power to the electrode material to adjust a diffraction angle of a beam transmitting through the liquid crystal.

8. An optical pickup method, comprising: diffracting a light beam into discrete beams, comprising at least a main beam and a sub beam, the diffracting comprising selectively refracting a beam through differing refractive indexes and directions with a liquid crystal according to a track pitch of the optical disc by selectively supplying power to the liquid crystal through an electrode material; and photoelectrically converting detected beam spots as diffracted by the diffracting of the light beam into electric signals to detect the main beam for information recorded on a medium and the sub beam for tracking servo for the medium, wherein the supplying of power to the liquid crystal comprises applying power to at least one of a first electrode layer formed of a plurality of rectangular bar-shaped electrodes disposed at predetermined distances from each other and a second electrode layer formed of a plurality of rectangular bar-shaped electrodes disposed in parallel with the electrodes of the first electrode layer but having different widths and directions from the electrodes of the first electrode layer.

9. The optical pickup method of claim 8, wherein the supplying of power to at least one of the first electrode layer and the second electrode layer is based on the track pitch of the optical disc.

10. The optical pickup method of claim 8, wherein the supplying of power comprises turning on or off power based on a track pitch of the medium, thereby powering the electrode material or cutting off power to the electrode material to adjust a diffraction angle of a beam transmitting through the liquid crystal.

11. A recording and/or reproducing apparatus, comprising: a laser diode to emit at least two light beams of different wavelengths; a diffraction grating to split a light beam from the laser diode into at least three discrete beams comprising at least one main beam and two sub beams, the diffraction grating comprising a substrate to refract an input beam at a predetermined refractive index, a liquid crystal to refract the substrate refracted beam at differing refractive indexes and directions according to a track pitch of a medium, an electrode material to supply power to the liquid crystal, and a switch to control the power supply to the electrode material for selecting one of the differing refractive indexes for generating beam spots on the medium to read/write information from/to the medium; and a photo detector to photoelectrically convert the beam spots reflected from the medium into electric signals to detect the main beam for information recorded on the medium and at least one of the sub beams for tracking servo for the medium, and to record and/or reproduce data from the medium based on the detected main beam and the at least one sub beam, wherein the electrode material comprises upper and lower electrode parts disposed at respective upper and lower parts of the liquid crystal, and one of the upper and lower electrode parts comprises a plurality of rectangular bar-shaped electrodes disposed laterally at predetermined distances from each other but having different widths and directions from each other.

12. The recording and/or reproducing apparatus of claim 11, wherein the substrate is a light transmitting material.

13. A recording and/or reproducing apparatus comprising: a laser diode to emit at least two light beams of different wavelengths; a diffraction grating to split a light beam from the laser diode into at least three discrete beams comprising at least one main beam and two sub beams, the diffraction grating comprising a substrate to refract an input beam at a predetermined refractive index, a liquid crystal to refract the substrate refracted beam at differing refractive indexes and directions according to a track pitch of a medium, an electrode material to supply power to the liquid crystal, and a switch to control the power supply to the electrode material for selecting one of the differing refractive indexes for generating beam spots on the medium to read/write information from/to the medium; and a photo detector to photoelectrically convert the beam spots reflected from the medium into electric signals to detect the main beam for information recorded on the medium and at least one of the sub beams for tracking servo for the medium, and to record and/or reproduce data from the medium based on the detected main beam and the at least one sub beam, wherein the electrode material comprises upper and lower electrode parts disposed at respective upper and lower parts of the liquid crystal, and one of the upper and lower electrode parts comprises a plurality of rectangular bar-shaped electrodes disposed laterally at predetermined distances from each other, and wherein the one of the upper and lower electrode parts comprises a first electrode layer formed of a plurality of the plurality of rectangular bar-shaped electrodes disposed at predetermined distances from each other, and a second electrode layer formed of a plurality of the plurality of rectangular bar-shaped electrodes disposed in parallel with electrodes of the first electrode layer but having different widths and directions from the electrodes of the first electrode layer.

14. The recording and/or reproducing apparatus of claim 13, wherein the switch supplies power to at least one of the first electrode layer and the second electrode layer based on the track pitch of the medium.

15. The recording and/or reproducing apparatus of claim 11, wherein the liquid crystal comprises liquid crystal molecules formed in a plurality of parallel lines, each molecule being spaced apart by a predetermined distance, with the electrode material being in contact with the upper and lower parts of the liquid crystal, respectively, and the substrate being disposed on other planes of the electrode material not in contact with the liquid crystal.

16. A recording and/or reproducing apparatus comprising: a laser diode to emit at least two light beams of different wavelengths; a diffraction grating to split a light beam from the laser diode into at least three discrete beams comprising at least one main beam and two sub beams, the diffraction grating comprising a substrate to refract an input beam at a predetermined refractive index, a liquid crystal to refract the substrate refracted beam at differing refractive indexes and directions according to a track pitch of a medium, an electrode material to supply power to the liquid crystal, and a switch to control the power supply to the electrode material for selecting one of the differing refractive indexes for generating beam spots on the medium to read/write information from/to the medium; and a photo detector to photoelectrically convert the beam spots reflected from the medium into electric signals to detect the main beam for information recorded on the medium and at least one of the sub beams for tracking servo for the medium, and to record and/or reproduce data from the medium based on the detected main beam and the at least one sub beam, wherein the electrode material comprises upper and lower electrode parts disposed at respective upper and lower parts of the liquid crystal, and one of the upper and lower electrode parts comprises a plurality of rectangular bar-shaped electrodes disposed laterally at predetermined distances from each other, wherein the liquid crystal comprises liquid crystal molecules formed in a plurality of parallel lines, each molecule being spaced apart by a predetermined distance, with the electrode material being in contact with the upper and lower parts of the liquid crystal, respectively, and the substrate being disposed on other planes of the electrode material not in contact with the liquid crystal, and wherein the electrodes of the first and second electrode layers are aligned in different directions from each other so that respective liquid crystal molecules create different refractive indexes and directions when power is supplied through the electrode material, with the switch supplying power selectively to one of the first and second electrode layers.

17. The recording and/or reproducing apparatus of claim 11, wherein the switch is turned on or turned off based on the track pitch of the medium, thereby powering the electrode material or cutting off power to the electrode material to adjust a diffraction angle of a beam transmitting through the liquid crystal.

18. The optical pickup apparatus of claim 1, wherein the electrode material changes the refractive index of the liquid crystal to adjust the diffraction efficiency and diffraction angle of beams, so that the optical pickup apparatus is compatible with different types of optical discs.

19. The optical pickup method of claim 8, wherein one of the first electrode layer and the second electrode layer changes the refractive index of the liquid crystal to adjust the diffraction efficiency and diffraction angle of beams, so that the optical pickup apparatus is compatible with different types of optical discs.

20. The recording and/or reproducing apparatus of claim 11, wherein the electrode material changes the refractive index of the liquid crystal to adjust the diffraction efficiency and diffraction angle of beams, so that the optical pickup apparatus is compatible with different types of optical discs.

* * * * *

UNITED STATES PATENT AND TRADEMARK OFFICE
CERTIFICATE OF CORRECTION

PATENT NO. : 7,715,297 B2 Page 1 of 1
APPLICATION NO. : 11/150116
DATED : May 11, 2010
INVENTOR(S) : Tae-youn Heor et al.

It is certified that error appears in the above-identified patent and that said Letters Patent is hereby corrected as shown below:

Title page, item [75] (Inventors), Line 3, change "Gyeonggii-do" to --Gyeonggi-do--.

Signed and Sealed this

Seventeenth Day of August, 2010

David J. Kappos
*Director of the United States Patent and Trademark Office*